(12) United States Patent
Clarke et al.

(10) Patent No.: US 12,503,623 B2
(45) Date of Patent: Dec. 23, 2025

(54) ANAEROBICALLY CURABLE COMPOSITIONS

(71) Applicant: Henkel IP & Holding GmbH, Duesseldorf (DE)

(72) Inventors: Greg Clarke, Blessington County (IE); Rory Barnes, Dublin (IE); Patrick O'Dwyer, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 662 days.

(21) Appl. No.: 17/494,350

(22) Filed: Oct. 5, 2021

(65) Prior Publication Data

US 2022/0025216 A1 Jan. 27, 2022

Related U.S. Application Data

(63) Continuation of application No. PCT/EP2020/059268, filed on Apr. 1, 2020.

(30) Foreign Application Priority Data

Apr. 5, 2019 (GB) .................................... 1904878

(51) Int. Cl.
| | |
|---|---|
| *C09J 4/06* | (2006.01) |
| *C09J 5/06* | (2006.01) |
| *C09J 133/14* | (2006.01) |
| *C09J 175/16* | (2006.01) |
| *F16B 39/22* | (2006.01) |

(52) U.S. Cl.
CPC . *C09J 4/06* (2013.01); *C09J 5/06* (2013.01); *C09J 133/14* (2013.01); *C09J 175/16* (2013.01); *F16B 39/225* (2013.01); *C09J 2433/00* (2013.01); *C09J 2475/00* (2013.01)

(58) Field of Classification Search
CPC .......... C09J 4/06; C09J 175/14; C09J 175/16; F16B 39/225

See application file for complete search history.

(56) References Cited

U.S. PATENT DOCUMENTS

| | | | |
|---|---|---|---|
| 3,218,305 A | 11/1965 | Krieble | |
| 3,425,988 A | 2/1969 | Gorman et al. | |
| 3,625,875 A * | 12/1971 | Frauenglass | C08F 291/02 |
| | | | 156/332 |
| 3,994,764 A * | 11/1976 | Wolinski | C09J 4/06 |
| | | | 525/445 |
| 4,180,640 A | 12/1979 | Melody et al. | |
| 4,287,330 A | 9/1981 | Rich | |
| 4,321,349 A | 3/1982 | Rich | |
| 4,348,503 A * | 9/1982 | Bachmann | C09J 4/00 |
| | | | 525/454 |
| 5,605,999 A | 2/1997 | Chu | |
| 7,041,747 B1 | 5/2006 | Attarwala et al. | |
| 2004/0194881 A1* | 10/2004 | Hung | C09J 5/06 |
| | | | 156/331.7 |
| 2013/0309504 A1* | 11/2013 | Nakamura | C09J 175/06 |
| | | | 156/331.7 |
| 2018/0237661 A1* | 8/2018 | Ledwith | C09D 133/10 |

FOREIGN PATENT DOCUMENTS

| | | | | |
|---|---|---|---|---|
| CN | 101711259 A | 5/2010 | | |
| CN | 102558490 | 7/2012 | | |
| EP | 0077659 . | 4/1983 | | |
| EP | 0548369 | 6/1993 | | |
| FR | 1581361 | 9/1969 | | |
| WO | 2004024841 | 3/2004 | | |
| WO | 2008153673 | 12/2008 | | |
| WO | WO-2012105220 A1 * | 8/2012 | ......... | C08G 18/4208 |
| WO | 2017068196 | 4/2017 | | |
| WO | 2018077617 | 5/2018 | | |

OTHER PUBLICATIONS

Universal Selector (Dynacoll 7380 Technical Data Sheet, Universal Selector, 2023, 2 pages).*
Lubrizol (ESTANE 5703 Ester Based Thermoplastic Polyurethane, Songhan Plastic Technology Co., Ltd., 2023, 2 pages).*
Machine translation of WO 2012/105220 (2012, 26 pages).*
International Search Report issued in connection with International Patent Application No. PCT/EP2020/059268 mailed on Jul. 29, 2020.
R.D. Rich, "Anaerobic Adhesives" in Handbook of Adhesive Technology, 29, 467-79, A. Pizzi and K.L. Mittal, eds., Marcel Dekker, Inc., New York (1994).

* cited by examiner

*Primary Examiner* — Brieann R Johnston
(74) *Attorney, Agent, or Firm* — Steven C. Bauman

(57) ABSTRACT

An anaerobically curable composition in dry to touch is provided, which is formed from:
(a) a liquid anaerobically curable component;
(b) a thermoplastic polyurethane ("TPU") component in an amount of about 10% to about 35%, for example from about 20% to about 30%, by weight based on the total weight of the composition; and
(c) a curing component for curing the liquid anaerobically curable component.

21 Claims, 1 Drawing Sheet

ANAEROBICALLY CURABLE COMPOSITIONS

FIELD

The present invention relates to a curable composition which can be pre-applied to an article for example in a non-mobile, substantially non-tacky form for example as a coating. The article can thus be conveniently handled, packed, transported and stored for an extended period, after which the pre-applied composition can be caused to cure at a selected time. Of particular interest is a curable composition that cures anaerobically. A composition that can be pre-applied to an article in a non-mobile, substantially non-tacky form and then later cured anaerobically is of interest. One end-use application of such compositions is as threadlockers.

BACKGROUND

Anaerobically curable compositions generally are well known. See e.g. R. D. Rich, "Anaerobic Adhesives" in Handbook of Adhesive Technology, 29, 467-79, A. Pizzi and K. L. Mittal, eds., Marcel Dekker, Inc., New York (1994), and references cited therein. Their uses are legion and new applications continue to be developed.

Anaerobic adhesive systems are those which are stable in the presence of oxygen, but which polymerize in the absence of oxygen. Polymerization is initiated by the presence of free radicals, often generated from peroxy compounds. Anaerobic adhesive compositions are well known for their ability to remain in a liquid, unpolymerized state in the presence of oxygen and to cure to a solid state upon the exclusion of oxygen.

Often times anaerobic adhesive systems comprise resin monomers terminated with polymerizable acrylate ester such as methacrylate, ethylacrylate and chloroacrylate esters [e.g., polyethylene glycol dimethacrylate and urethane-acrylates (e.g., U.S. Pat. No. 3,425,988 (Gorman)] derived according to known urethane chemistry. Other ingredients typically present in anaerobically curable adhesive compositions include initiators, such as an organic hydroperoxide for example cumene hydroperoxide, tertiary butyl hydroperoxide and the like, accelerators to increase the rate at which the composition cures, and stabilizers such as quinone or hydroquinone, which are included to help prevent premature polymerization of the adhesive due to decomposition of peroxy compounds.

Desirable cure-inducing compositions to induce and accelerate anaerobic cure may include one or more of saccharin, toluidines, such as N,N-diethyl-p-toluidine ("DE-p-T") and N,N-dimethyl-o-toluidine ("DM-o-T"), and acetyl phenyl hydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH are used as standard cure accelerator components in anaerobic adhesive cure systems. Indeed, many of the LOCTITE®-brand anaerobic adhesive products currently available from Henkel Corporation use either saccharin alone or both saccharin and APH.

Anaerobically curable adhesive compositions also commonly include chelators such as ethylenediamine tetraacetic acid (EDTA) which are employed to sequester metal ions.

Preparation of anaerobically curable compositions which includes an anaerobically curable component typically involves a liquid carrier component. The composition is thus typically in a liquid form and may be dispensed, for example by an applicator. For use, the anaerobically curable component is applied by a suitable applicator, to form a layer or coating on the surface. Often anaerobically curable compositions are applied as a bead, for example a continuous bead to form a gasket.

The anaerobically curable material often remains wet even after application until exposed to anaerobic conditions suitable for cure. For example in many cases an anaerobic curable composition contains a liquid monomer.

Even though the anaerobic curable composition may dry off somewhat, for example through evaporation (by being dried, or allowed to dry for a period), the material often remains wet and tacky. This leads to: potential contamination of anything that contacts the articles to which the material has been applied and also unwanted removal of the material which has been applied. The latter concern potentially compromises the integrity of any bond or seal later formed by the anaerobically curable composition because an insufficient amount may remain to form the desired bond or seal.

And of course where the liquid carrier material is itself the liquid monomer, it will remain in its liquid form until such time as it is anaerobically cured. So even though these compositions may be applied on a substrate, awaiting exposure to anaerobic conditions, they will remain wet or at least tacky until cured.

Furthermore in anaerobically curable composition it is known that the presence of cure initiators such as peroxides can cause premature cure, for example the composition may not be storage stable when stored in as a one-part composition. In this respect it is known to formulate compositions as two-part compositions with the anaerobically curable component in a first part and a cure initiator in a second part. The two parts are stored separately and mixed shortly before the composition is to be used.

It is also known to encapsulate, such as microencapsulate, the cure initiator e.g. a peroxide such as a microencapsulated benzyl peroxide. Such encapsulation forms a physical barrier between the cure initiator and the anaerobically curable component and thus often times they can be together in a one-part composition without the cure initiator causing premature cure of the anaerobically curable component. In order to cause cure at the appropriate time there is often a requirement for some mechanical force, such as a shear force, to be applied to the composition to physically disrupt/rupture the microencapsulated cure initiator in order to cause cure of the anaerobically curable component. For example the shear force experienced by a composition on the threads of a male and/or female threadlocking part is often sufficient to disrupt the microencapsulation and release the cure initiator thus facilitating cure.

In the past additional components such as thickeners have been added to the material to make it less flowable but because other components are liquid the overall composition remains somewhat flowable and/or tacky.

Tape products have existed for example Loctite® 249 Quicktape. This product consists of a liquid anaerobic threadlocker, sandwiched between two films of non-reactive polyamide/polyurethane film.

Compositions, including those that are suitable for use in threadlocking applications may be applied in a dry to touch form but with later stage anaerobic cure functionality. To achieve this additional components are often used.

In some cases a dry to touch form is achieved using a cure mechanism. For example a first cure mechanism may form the dry to touch form so as to hold the composition in place on an article while a second (anaerobic) cure mechanism is activated later to achieve cure, for example to achieve threadlocking.

For example European Patent No. 0 077 659 (Thompson) describes a pre-applied polymerizable fluid for sealing and locking engineering parts. The composition has two mechanisms for curing and two curing reactions take place. The first mechanism is a UV light cure. An opacifier is dispersed in the fluid so that the fluid becomes substantially opaque to radiation. After the fluid is applied to the component it is exposed to UV radiation whereupon a coating is formed, creating a surface layer which is a dry, tack-free crust. The subcutaneous fluid is unaffected by the radiation and remains in a generally liquid state. When the component is threaded into another the surface layer breaks and the second polymerisation (such as a free radical polymerization) is initiated and the second cure reaction takes place. The second polymerization mechanism acts to lock the threads together. In Thompson, only a skin is formed in the first polymerization and the remainder of the composition remains fluid below the skin. There is a risk therefore that during handling of the coated engineering parts the skin may be disrupted and the fluid composition may leak out.

European Patent No. 0 548 369 (Usami) describes a pre-applied adhesive composition for application to the threaded contact faces of a screw. The composition comprises a photo-hardening binder in which a secondary curable composition is dispersed. The secondary curable composition includes microencapsulated reactive monomer/activator/initiator.

International Patent Publication WO2004/024841 A2 (Haller) describes curable compositions for application to a threaded article. The composition comprises a dispersion of components of a first cure mechanism comprising: (a) a (meth)acrylate functional monomer component; (b) a (meth)acrylate functional oligomer component; and (c) a photoinitiator component; and (ii) components of a second cure mechanism comprising: (e) an amine component; and (f) an encapsulated epoxy resin component; together with (iii) a thickener component. The photoinitiator component is suitable upon irradiation of the composition to achieve a first cure through the depth of the composition applied to a threaded article so that a binder matrix is formed with the components of the second cure mechanism dispersed through the matrix.

An English language Abstract for Chinese patent publication CN102558490 seemingly discloses a hot-meltable prepolymer, which is a urethane or polyurethane (meth)acrylate prepolymer with (meth)acryloyl terminal groups. The melting point of the prepolymer is 50-80° C. An anaerobic adhesive is prepared from the hot-meltable prepolymer, monomer containing at least one acrylic ester group or methacryloyl group, promoter, stabilizer and initiator. Liquid monomers are combined with the prepolymer to form a gel.

International publication WO 2017/068196 to the present Applicants describes an anaerobically curable composition comprising an anaerobically curable component that is a combination of a solid resin component and a solid anaerobically curable monomer. A curing component for curing the anaerobically curable component is included. The composition is solid and has a melting point in the range from 30° C. to 100° C. The composition is dry to touch and can be used to form articles of manufacture such as a tape, an elongate filament, a gasket, a patch.

Notwithstanding the state of the art, it would be desirable to provide alternative anaerobically curable compositions that are suitable for typical end use applications of anaerobically curable compositions including in threadlocking applications.

SUMMARY

The present invention provides an anaerobically curable composition, desirably a one-part composition, comprising:
(i) a liquid anaerobically curable component;
(ii) a thermoplastic polyurethane ("TPU") in an amount of from about 10% to about 35% such as about 15% to about 35%, for example from about 20% to about 30%, by weight based on the total weight of the composition; and
(iii) a curing component for curing the liquid anaerobically curable component.

Compositions of the invention are dimensionally stable or non-flowable at room temperature. They are also dry to touch.

A further feature of the invention is that the curing component can be present in, for example dispersed within, a composition of the invention even when in the form of a one-part composition without any requirement for physical separation of the curing component from the liquid anaerobically curable component. For example no encapsulation such as microencapsulation of the curing component, such as peroxide e.g. benzyl peroxide is required.

The presence of the TPU allows for the composition of the invention to be produced in a dry to touch, optionally pre-applied form, without the requirement for drying of the composition, for example allowing it to dry by evaporation or by actively drying. This compares favourably to other anaerobically curable compositions which require drying, for example to remove a liquid carrier such as water, where the drying is carried out at elevated temperature, such as above 80° C. for 20 minutes or more.

It has been surprisingly found that after dissolving a thermoplastic polyurethane (TPU) material with a relatively low melting point (such as for example of from about 30° C. to about 100° C., for example about 58° C., or for example about 70° C.) in a liquid anaerobically curable component (such as for example hydroxypropyl methacrylate), at a temperature above the melting point of said TPU, and doing so at a relatively high weight percentage based on the total weight of the composition (TPU from about 10% to about 35%, for example from about 20% to about 30%, based on the total weight of the composition), and allowing the mixture to cool, the resulting anaerobically curable composition has a solid-form at room-temperature (25° C.). As used herein, the term solid can encompass rigid solids, crystalline solids, liquid crystalline solids, and biphasic liquid crystalline/crystalline solids, at room temperature (25° C.).

The TPUs comprised in the anaerobically curable compositions of the present invention may have solubility values at 65° C. of at least 40% by weight based on the weight of the liquid anaerobically curable component.

The presence of the TPU imparts a solid form to the composition. Without wishing to be bound by any theorem, it is thought that TPU materials which have high crystallisation rates and relatively low glass transition temperatures such as, for example, from about −50° C. to about −10° C. are the most suitable for imparting solid form to otherwise liquid-form anaerobically curable compositions, at 25° C. It is thought that the relatively rapid crystallisation of the TPU may advantageously promote microscale encapsulation of liquid-form anaerobically curable component during formulation of compositions of the present invention, such that the total composition is in the form of a non-flowable dry to touch material, for example soft solid at 25° C., while the anaerobically curable component is maintained in a curable state.

Furthermore once crystallisation has taken place, it is thought that diffusion of the cure initiator, for example peroxide, through the solid matrix cannot freely occur. Accordingly compositions of the invention remain stable despite the active cure initiator such as peroxide being in the presence of the anaerobically curable composition.

As mentioned above this negates the need for encapsulation such as microencapsulation of the cure initiator such as peroxide. It also obviates the necessity for disruptions such as rupturing of microcapsules in order to achieve proper curing of the anaerobically curable composition. With compositions of the invention the composition of the curing initiator such as peroxide will only occur at a metallic part interface, thus allowing for on-part curing once assembled. The composition of the curing cure initiator does not take place through the bulk adhesive before contact with the metallic part interface.

The formulation of compositions of the invention provide the composition in solid tack-free form. The compositions of the invention are suitable for pre-application, for example as a threadlocking formulation.

The liquid anaerobically curable component of a composition of the invention act(s) as a carrier for any other component.

While any component, for example initiator or monomer, may be in liquid form could be encapsulated this is not a requirement of the present invention.

Compositions of the invention can be applied in any manner. One advantage is that the compositions of the invention can be made and/or applied to a substrate in a manner that does not require use of a liquid carrier. A liquid carrier such as organic solvent or water is thus not required. This avoids the necessity for a liquid carrier for the composition. A composition of the invention is essentially dry with consequent handling advantages. For example the compositions of the invention will flow before crystallisation of the TPU takes place and there is no requirement for a liquid carrier, and there is no requirement for drying off of solvent or water to achieve application to a substrate. Furthermore they are thermoplastic and can be heated to a liquid flowable form and cooled or allowed to cool to re-solidify. This means re-working, for example removal and re-application is possible.

Compositions of the invention typically have a low on-torque allowing for parts to be threaded on and torqued by hand without the use of any tool (such as a wrench/power tool). For example an applied torque of less than about 0.5 N·m, such as less than about 1.0 N·m will allow mating threaded parts to be threaded together with a composition of the invention present on the mating threads. Therefore the compositions of the invention do not create a substantive resistance to the mating of parts.

Dry-handling of the product, for example on production lines, is thus both achievable and advantageous. Once applied (to a substrate) compositions of the invention will also be dry. Dry to touch products are desirable from a handling point of view to eliminate contamination, fouling, spillages, loss of composition from a substrate etc.

Compositions of the invention are, in their curable form, thermoplastic. This means they can be heated until they are in flowable form, then allowed to cool, or actively cooled, back to a solid (dry to touch) form. Being thermoplastic this heating to flowable form and cooling to a solid (dry to touch) form cycle can be repeated. The composition remains curable.

Compositions of the invention have many end-use applications as with traditional anaerobically curable compositions.

Compositions of the present invention have applications in metal-metal bonding, such as threadlocking compositions, for securing, for example a female threaded article to a male threaded article, e.g. for securing nuts and bolts. The product cures when confined in the absence of air between close fitting (e.g. metal) surfaces. It protects threads from rust and corrosion and prevents loosening from shock and vibration.

The compositions of the invention are suitable for storage or handling e.g. shipping even when applied on a part. This storage or handling does not adversely affect the integrity of the composition for example when it is present as a coating.

Mating surfaces such as flanges e.g. in the automotive industry, in the past have been sealed by applying a liquid anaerobically curable composition onto the face of one of the surfaces. The two surfaces, for example flange faces, are then assembled and the product cures in the absence of oxygen thereby creating a gasket and a seal.

This invention provides a composition suitable for flange sealing. Flange sealing may be achieved whereby the composition is applied onto the surface of one of the flanges as a (curable) dry to touch pre-applied composition.

Optionally the TPU is a modified TPU which includes one or more (meth)acrylate end groups. The TPU can therefore be incorporated as a reactive material which participates in the anaerobic cure.

Crystallisation rates of TPUs can be tested for and classified as follows: A test TPU can be finely sliced and then dissolved in ethyl anaerobically curable at 65° C. at a weight ratio of 1:9. Dissolution can be facilitated by the use of a dissolver head operating at 1330 revolutions per minute. The solution can then be allowed to cool to room temperature (25° C.) over 24 hours. The crystallisation rate can then classified as follows: A TPU can be classified as having a "High crystallisation rate" if crystals, of any sort, are found to have been formed during said time-period. Crystal detection can be performed by any convenient suitable technique well-known in the art, for example, differential scanning calorimetry or wide angle X-ray scattering. In cases where complete solidification occurs over said time-period, the TPU used in that test can be further classified as having an "Extremely high crystallisation rate". Similarly, a TPU can be classified as having a "Low crystallisation rate", if the solution remains liquid and no crystals form within said time-period.

A TPU based on a polyol that is based on at least one of a diol or a dicarboxylic acid characterised in that at least one of said diol or dicarboxylic acid has greater than 10 carbon atoms ($>C_{10}$) in the main chain, is suitable for use in compositions of the present invention. (Co)Polyester polyols can be synthesised from at least one diol and at least one dicarboxylic acid. By a 'greater than $C_{10}$ dicarboxylic acid' is meant a dicarboxylic with more than 10 carbon atoms in the main chain, as such terms would be understood by someone of ordinary skill in the art. For example, dodecanedioic acid has 12 carbon atoms in the main chain and is thus an example of a greater than $C_{10}$ dicarboxylic acid. By a 'greater than $C_{10}$ diol' is meant a diol with more than 10 carbon atoms in the main chain. For example dodecanediol has 12 carbon atoms in the main chain and is thus an example of a greater than $C_{10}$ diol.

Desirably the TPU component has a glass transition temperature of from about −60° C. to about 0° C., and a melting point of from about 30° C. to about 100° C. as measured by differential scanning calorimetry in accordance with ISO11357.

Formulation of the compositions and products of the present invention can be achieved by mixing the TPU component into a liquid anaerobically curable component at elevated temperature. Desirably, these components are mixed, for example at about 1000 rpm, under elevated temperature conditions, for example, 50° C. to 65° C. The TPU may then be added, while maintaining the temperature at about 50° C. to 65° C. Or, the TPU material may, optionally, be preheated above its melting point before its addition to the liquid anaerobically curable component. The actual temperature used may vary depending upon the melting point of the particular TPU or its solubility in the liquid anaerobically curable component. Mixing is performed for a time sufficient to dissolve the TPU component into the liquid anaerobically curable component, which time can vary depending on the batch size. Generally, only seconds (s) or minutes (mins) are required to achieve the desired blending in of the TPU component. The curable composition will thus become thickened upon returning to room temperature (25° C.) and will be a non-flowable soft solid. The so-formed composition may then be dispensed into a dispensing container, such as a lipstick-type dispenser, or a type similar to that used for PrittStick™, while hot. The composition is then allowed to cool, or is cooled in a controlled manner, to create a soft-solid liquid anaerobically curable component of the present invention.

The TPU component is present in an amount from about 10% to about 35%, by weight based on the total weight of the composition.

The TPU component may have a glass transition temperature of from about −60° C. to about −5° C., such as from about −50° C. to about −10° C.

The TPU component may have a glass transition temperature of from about −55° C. to about −20° C., such as from about −50° C. to about −30° C.

The TPU component may comprise polyester segments. For example the TPU component may comprise polyester segments, based on at least one of a greater than $C_{10}$ diol or a greater than $C_{10}$ dicarboxylic acid.

The TPU component may be based on a polyester polyol formed from 1,6-hexane diol and a greater than $C_{10}$ dicarboxylic acid.

The TPU component may be based on a (co)polyester of dodecanedioic acid and 1,6-hexanediol, said (co)polyester having a melting point of about 70° C., and with an OH number from about 27 to about 34 mg KOH/g (as measured according to standard procedure DIN 53240-2).

The TPU component may have a mass average molar mass $M_w$ from about 50,000 to about 100,000, suitably from about 55,000 to 75,000.

Thermoplastic polyurethanes (TPUs) are materials that have polarity through interactions via H-bonding. While they are thermoplastic they do have some properties of thermoset materials due to this high level of interaction. Phase separation is a consequence of the high affinity between high Tg crystalline "hard" domains driven by the presence of hydrogen bonding and other non-covalent forces which create physical crosslinks between polymer chains. The high degree of aggregation and order in this phase located in the soft and flexible matrix endows TPU elastomers with the ability to mechanically deform and subsequently return to their original state.

The invention also relates to a method of preparing a dry to touch mass of the curable composition of the invention and comprising the steps of:
 (i) mixing a TPU component with an liquid anaerobically curable component at a temperature above the melting point of said TPU component, forming a mixture; and
 (ii) allowing the mixture of step (i) to cool, or cooling said cast mixture, sufficiently to solidify the composition.

Optionally a method of the invention comprises casting the mixture in a cast, for example a container, or on a substrate to be bonded.

For example a composition of the invention may be heated and applied as a liquid. For example it may be heated to about 40° C. or higher and then applied. When cooled down it solidifies. The part to be assembled thus has a pre-applied gasket on one surface and will not cure until the parts are assembled.

Furthermore, the compositions of the invention have shown long-term on-part stability. For example stability in excess of three months has been achieved.

A further advantage of the compositions of the present invention is that there is no cross contamination when a composition of the invention touches another article. For example, when fasteners are stored loosely together and in contact with each other, no cross contamination of the composition of the invention occurs.

In respect of the present invention tack free means dry to the touch yet the composition will not flake off during handling or use. For example an article to which the composition of the invention is applied is dry to the touch. An article to which a composition of the invention has been applied is considered dry to the touch if 20 of such articles are individually placed on dry tissue paper for four hours and there is no change in appearance of the tissue.

Commercial available TPUs include those sold under the following trade names:
 Pearlbond™ 500/501/503/522/100/104/106/1160L/700*
 Pearlstick™ DIPP 539, 48/60-03, 48/60-19
 Desmocoll™ 540/5*, 530/3
 *Extremely high/Ultrafast crystallisation rates.

Any suitable liquid anaerobically curable component may be used in the composition of the invention. The only requirement is that the TPU solubilises in the composition.

The liquid anaerobically curable component may comprise an anaerobically curable monomer. The liquid anaerobically curable component may comprise an anaerobically curable resin component. The resin component has functionality to make it curable by redox initiated polymerisation.

In a composition of the invention the liquid anaerobically curable component may be a combination of separate/different components. Where the liquid anaerobically curable component is a combination of separate/different components it is desirable that at least two, and desirably all components are anaerobically curable. Where there is more than one component desirably at least two and desirably all are functional insofar as they participate in an anaerobic cure reaction. They are reactive.

It will be appreciated that other components may not participate in an anaerobic cure reaction. They are unreactive. Such components may however become part of the cure product having been incorporated therein during the curing of other components.

Where a composition of the invention includes a resin component it is desirable that the resin is anaerobically curable (it participates in an anaerobic cure of the composition).

The anaerobically curable component desirably comprises anaerobically curable monomer such as at least one acrylate or methacrylate ester group.

The curing component is typically present in an amount of from about 0.1 to about 10%, such as from about 1 to about 5%, for example about 5% by weight based on the total weight of the composition.

Desirable cure-inducing components to induce and accelerate anaerobic cure may include one or more of saccharin, toluidines, such as N,N-diethyl-p-toluidine ("DE-p-T") and N,N-dimethyl-o-toluidine ("DM-o-T"), and acetyl phenyl hydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Stabilizers such as quinone or hydroquinone may be included.

It will be appreciated that a composition of the invention does not have a liquid carrier component and thus can be considered to be essentially solvent-free, for example comprising less than about 1% solvent, such as less than about 0.5% solvent such as less than 0.05% such as less 0.01% by weight based on the total weight of composition. So an advantage of the present invention is that there is no liquid carrier required with the result that the composition comprises little or no solvent (for example organic solvent or water).

In a composition of the invention the liquid anaerobically curable component may be present in an amount of from about 60% to about 85%, such as from about 65% to about 80%, by weight based on the total weight of the composition.

The invention also relates to a method of applying a composition of the invention to a substrate comprising the steps of:
 (i) providing a composition according to the invention;
 (ii) heating the composition to a flowable form; and
 (iii) applying the composition to the substrate.

The invention also relates to a method of providing a threadlocking composition on the threads of a threaded article to be thread locked comprising the steps of:
 (i) providing a composition according to the invention;
 (ii) applying the composition to the threads of the article.

Where a composition of the invention is provided in an at least two-part form those two parts may be separately applied.

It will be appreciated that the present invention also provides a method of threadlocking two threaded articles together comprising:
 (i) providing a composition according to the invention;
 (ii) applying the composition to the threads of at least one article;
 (iii) subsequently, (and optionally after active or passive cooling,) threading the two articles together so as to initiate anaerobic cure of the composition thus anaerobically curing the composition so as to chemically bond the two articles together.

The present invention also relates to an article, for example a bolt or nut, to which a composition according to the invention has been applied. It will be in an uncured form and in a form suitable for later anaerobic cure.

The invention also provides an assembly comprising two substrates bonded together by a cured form of a composition according to the present invention.

It will be appreciated however that compositions of the invention may be dry to the touch after a short time, for example after about 30 minutes.

The composition of the invention may be formulated as a one-part or two (or more) part composition.

The liquid anaerobically curable component can be selected from any suitable liquid anaerobically curable materials (or any combination of the materials) including those set out below.

Anaerobic curable compositions may have a liquid anaerobically curable component based on a suitable (meth)acrylate component.

One or more suitable (meth)acrylate components may be selected from among those that are a (meth)acrylate monomer having the formula: $H_2C\!=\!CGCO_2R^8$, where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

One or more suitable (meth)acrylate monomers may be chosen from among polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be suitable for use herein are silicone (meth)acrylate moieties ("SiMA"), such as those taught by and claimed in U.S. Pat. No. 5,605,999 (Chu), the disclosure of which is hereby expressly incorporated herein by reference.

Other suitable monomers may be chosen from polyacrylate esters represented by the formula

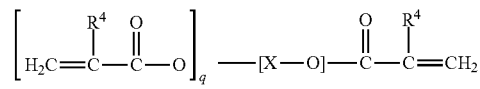

where $R^4$ is a radical selected from hydrogen, halogen or alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably about 30, and desirably about 20.

For example, X can be an organic radical of the formula:

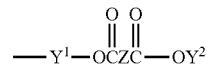

where each of $Y^1$ and $Y^2$ is an organic radical, such as a hydrocarbon group, containing at least 2 carbon atoms, and desirably from 2 to about 10 carbon atoms, and Z is an organic radical, preferably a hydrocarbon group, containing at least 1 carbon atom, and preferably from 2 to about 10 carbon atoms. Other monomers may be chosen from the reaction products of di- or tri-alkylolamines (e.g., ethanolamines or propanolamines) with acrylic acids, such as are disclosed in French Pat. No. 1,581,361.

Suitable oligomers with (meth)acrylate functionality may also be used. Examples of such (meth)acrylate-functionalized oligomers include those having the following general formula:

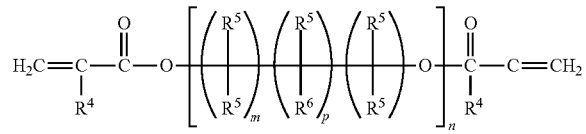

where $R^5$ represents a radical selected from hydrogen, alkyl of from 1 to about 4 carbon atoms, hydroxy alkyl of from 1 to about 4 carbon atoms, or

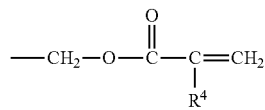

where $R^4$ is a radical selected from hydrogen, halogen, or alkyl of from 1 to about 4 carbon atoms; $R^6$ is a radical selected from hydrogen, hydroxyl, or

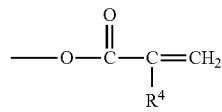

m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used.

Suitable compounds can be chosen from among are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively.

The so-formed (meth)acrylate urethane or urea esters may contain hydroxy or amino functional groups on the non-acrylate portion thereof. (Meth)acrylate esters suitable for use may be chosen from among those of the formula

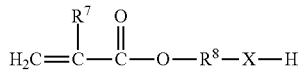

where X is selected from —O— and

where $R^9$ is selected from hydrogen or lower alkyl of 1 through 7 carbon atoms; $R^7$ is selected from hydrogen, halogen (such as chlorine) or alkyl (such as methyl and ethyl radicals); and $R^8$ is a divalent organic radical selected from alkylene of 1 through 8 carbon atoms, phenylene and naphthylene.

These groups, upon proper reaction with a polyisocyanate, yield a monomer of the following general formula:

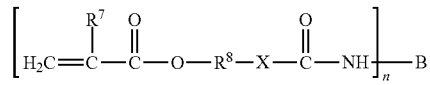

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^8$ and X have the meanings given above.

Depending on the nature of B, these (meth)acrylate esters with urea or urethane linkages may have molecular weights placing them in the oligomer class (such as about 1,000 g/mol up to about 5,000 g/mol) or in the polymer class (such as about greater than 5,000 g/mol).

Of course, combinations of these (meth)acrylate monomers may also be used.

Desirably the liquid anaerobically curable component comprises at least one acrylate or methacrylate ester group.

Desirably the liquid anaerobically curable component comprises is chosen from at least one of epoxy (meth)acrylates, urethane (meth)acrylates, urethane di(meth)acrylates, alkyl (meth)acrylates, stearyl (meth)acrylates, isocyanurate (meth)acrylates, bisphenol-A-(meth)acrylates, ethoxylated bisphenol-A-(meth)acrylates, bisphenol-F-(meth)acrylates, ethoxylated bisphenol-F-(meth)acrylates, bisphenol-A di(meth)acrylates, ethoxylated bisphenol-A-di(meth)acrylates, bisphenol-F-di(meth)acrylates, and ethoxylated bisphenol-F-di(meth)acrylates.

The inventive compositions may also include other conventional components, such as free radical initiators, free radical accelerators, inhibitors of free radical generation, as well as metal catalysts, such as iron and copper catalysts.

A number of well-known initiators of free radical polymerization may be incorporated into the inventive compositions including, without limitation, hydroperoxides, such as cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

If desired the initiator component may be encapsulated. For example the initiator component may be an encapsulated peroxide, for example encapsulated benzoyl peroxide.

Compositions of the present invention may further comprise thickeners and/or fillers.

As mentioned above it will be appreciated that the composition of the invention can include non-reactive species including resins. Such components do not participate in an anaerobic cure reaction. They are unreactive. Such components may however become part of the cure product having been incorporated therein during the curing of other components. Examples of such non-reactive species include: fumed silica, polyethylene, PTFE, mica, polyamide wax, titanium dioxide, barium sulphate.

The present invention also provides methods of preparing and using inventive anaerobic adhesive compositions, as well as the reaction products of the compositions.

The compositions of the present invention may be prepared using conventional methods which are well known to those persons of skill in the art. For instance, the components of the inventive composition may be mixed together in any convenient order consistent with the roles and functions the components are to perform in the compositions. Conventional mixing techniques using known apparatus may be employed.

BRIEF DESCRIPTION OF THE DRAWINGS

Embodiments of the invention will be described, by way of example only, with reference to the accompanying drawings in which.

DETAILED DESCRIPTION

A formulation was prepared based on Loctite® product 2701 (available from Henkel Corporation) which is a green, low viscosity, methacrylate-based threadlocking adhesive with high strength, especially for chromated surfaces. It exhibits steel fixture time of 10 min, brass 4 min and stainless steel 25 min. It tolerates slight contaminations of industrial oils. Suitable for all metal fasteners.

All components were mixed with the exception of DIPP 539 (TPU) and CHP.

This mixture was brought to a temperature of 65° C. whilst mixing gently. DIPP 539 was added under high shear using a dissolver stirrer in aliquot portions until all of the material was added. This facilitated proper dissolution of the polyurethane and ensured no clumping of the material. Full dissolution occurred within 30 mins at which time the mixture temperature is reduced to 45° C. At this time the CHP is added under low shear, this reduced both the time and temperature minimising exposure of the peroxide (CHP) thereby reducing any possible decomposition. After the peroxide (CHP) was added the mixture was allowed to cool overnight after which time it becomes solid. The composition prepared is set out in Table 1 below.

TABLE 1

| Material | Amount (grams) | % by weight based on the total weight of the composition |
|---|---|---|
| Hydroxypropyl Methacrylate (monomer) | 42.95 | 33.79 |
| SS 119 Low Mw polyurethane (methacrylate capped PU) | 32.3 | 25.41 |
| Flex II (Polyurethane resin/Isobornyl methacrylate mixture) | 10.02 | 7.89 |
| PM 16 (Free radical stabilizer) | 0.2 | 0.16 |
| PM 17 (Metal chelator) | 1.0 | 0.79 |
| Saccharin (accelerant) | 0.5 | 0.39 |
| DIPP 539 (Thermoplastic polyurethane) | 38.13 | 30 |
| CHP (initiator/peroxide) | 2.0 | 1.57 |

Comparative testing was done using Loctite® product 2701 as a control following the standard DIN 267 Part 27. "Cold" indicates room temperature. "Hot" indicates 150° C. The results are set out in the following Table 2:

TABLE 2

| Loctite ® 2701 Control (Break/Prevail) mPa | Composition of Table 1 Cold (Break/Prevail) mPa | Composition of Table 1 Hot (Break/Prevail) mPa |
|---|---|---|
| 38/20 | 33/5 | 1/0 |
| 45/21 | 33/2 | 17/6 |
| 32/25 | 34/5 | 5/2 |
| 60/45 | 19/2 | 15/4 |
| 44/32 | 32/6 | 5/1 |
| AVERAGE 44/29 | 30/4 | 9/3 |

It can be seen that the performance of a composition of the invention although not as high as the 2701 control is still quite acceptable for a medium to high strength threadlocker. These lower results are to be expected given the overall lower levels of active ingredients (70% versus 100% as is the case with 2701 control). This system can be further modified to include functionality within the TPU materials themselves with the incorporation of methacrylate or acrylate end chains, thereby reacting the TPU into the matrix. Further modification whilst using HQEE chain extenders would lead to better thermal stability of these materials which would give superior heat aging performance.

Figure 1:
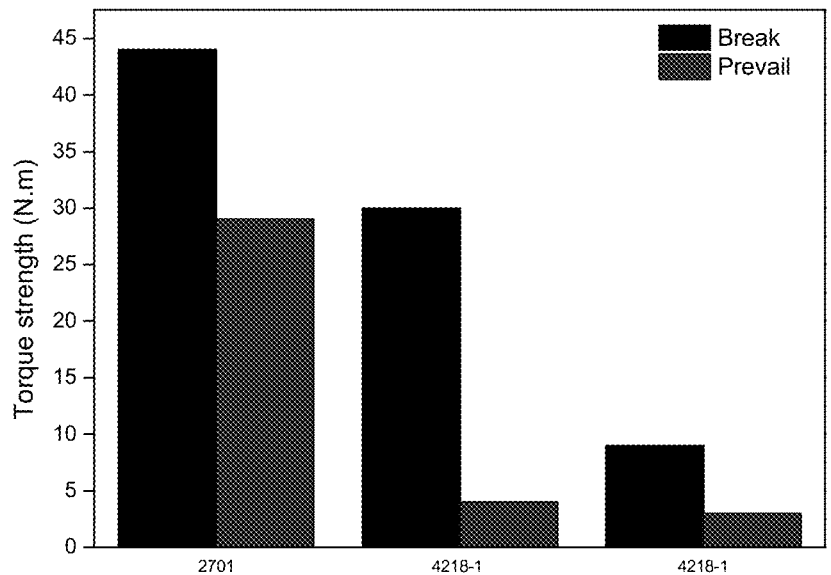
FIG. 1 shows Torque strength in N·m for a composition of the invention ("solid anaerobic formulation") versus a control (Henkel Loctite® product 2701). (For each composition the break value is represented by the left hand column and the prevail value is represented by the right hand column.)
Figure 2:
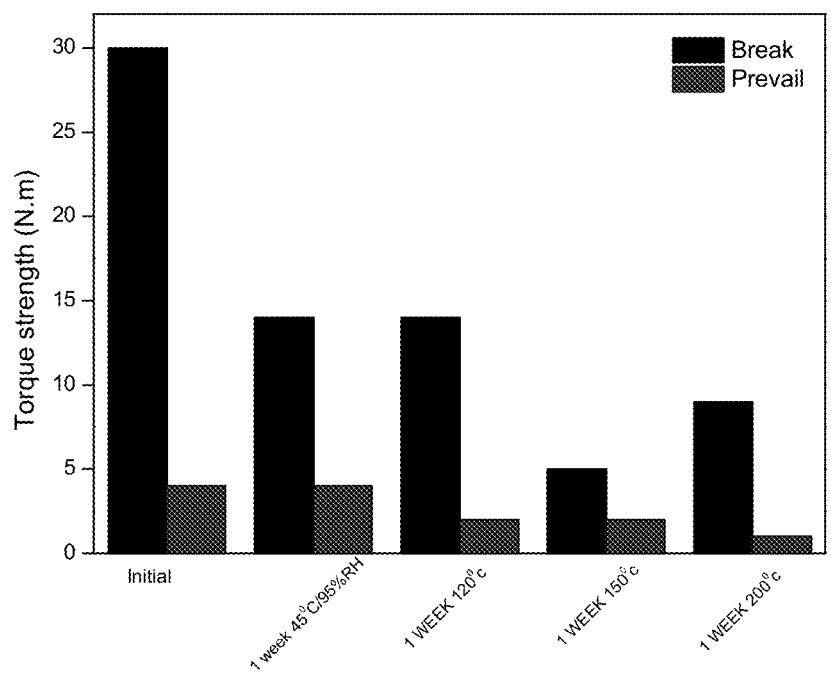
FIG. 2 shows the effect of aging on Torque strength in N·m for a composition of the invention ("solid anaerobic formulation") under different compositions. (For each composition the break value is represented by the left hand column and the prevail value is represented by the right hand column.)

The results shown in FIG. 2 show "on-part aging" of the composition of Table 1 for one month at room temperature. Each bolt was coated with the solid formulation (containing liquid CHP) and allowed to age at room temperature for 1 month. Cold formulation was used to coat parts which were assembled and aged under the conditions set out in Table 3 below:

TABLE 3

| 45 C/95% Humidity (Break Prevail) mPa | 120° C. | 150° C. | 200° C. |
|---|---|---|---|
| 7/2 | 9/1 | 2/2 | 11/2 |
| 20/4 | 16/2 | 7/3 | 7/1 |
| 5/2 | 13/2 | 5/1 | 7/1 |
| 26/7 | 16/3 | 6/2 | 14/2 |
| 12/3 | 15/3 | 7/1 | 7/1 |
| AVERAGE 14/4 | 14/2 | 5/2 | 9/1 |

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. An anaerobically curable composition in dry to touch form, the anaerobically curable composition formed from:
   (a) a liquid anaerobically curable component;
   (b) a thermoplastic polyurethane ("TPU") component present in an amount of from about 10% to about 35% by weight, based on the total weight of the anaerobically curable composition, wherein the TPU component comprises:
      (i) polyester segments, based on at least one of a greater than $C_{10}$ diol or a greater than $C_{10}$ dicarboxylic acid, or
      (ii) a (co)polyester of dodecanedioic acid and 1,6-hexanediol, said (co)polyester having a melting point of about 70° C., and with an OH number from about 27 to about 34 mg KOH/g (as measured according to standard procedure DIN 53240-2); and
   (c) a curing component for curing the liquid anaerobically curable component, wherein the curing component comprises a peroxide in liquid form free of encapsulation; and
   (d) a solvent present in an amount less than 1% by weight, based on the total weight of composition,
   wherein the TPU component has a mass average molar mass $M_w$ from about 50,000 to about 100,000, and wherein the TPU is soluble in the composition.

2. A composition according to claim 1, wherein the TPU component is present in an amount of from 20% to 30% by weight, based on the total weight of the composition.

3. A composition according to claim 1, wherein the TPU component comprises a modified TPU which includes one or more (meth)acrylate end groups.

4. A composition according to claim 1 wherein the liquid anaerobically curable component is present in an amount of from about 60% to about 85%, by weight based on the total weight of the composition.

5. A composition according to claim 1 wherein the liquid anaerobically curable component is present in an amount of from 65% to 80%, by weight based on the total weight of the composition.

6. A composition according to claim 1 wherein the liquid anaerobically curable component comprises at least one acrylate or methacrylate ester group.

7. A composition according to claim 1 wherein the curing component is present in an amount of from about 0.1 to about 10%, by weight based on the total weight of the composition.

8. A composition according to claim 1 wherein the curing component is present in an amount of from about 1 to about 5% by weight based on the total weight of the composition.

9. A composition according to claim 1 wherein the curing component is present in an amount of about 5% by weight based on the total weight of the composition.

10. A composition according to claim 1 wherein the TPU component has a mass average molar mass $M_w$ from about 55,000 to about 75,000.

11. A composition according to claim 1 wherein the TPU component comprises polyester segments, based on at least one of a greater than $C_{10}$ diol or a greater than $C_{10}$ dicarboxylic acid.

12. A composition according to claim 1 wherein the TPU component has a glass transition temperature of from about −60° C. to about 0° C., and a melting point of from about 30° C. to about 100° C. as measured by differential scanning calorimetry in accordance with ISO11357.

13. A composition according to claim 1 wherein the TPU component has a glass transition temperature of from about −55° C. to about −20° C.

14. A composition according to claim 1 wherein the TPU component has a glass transition temperature of from about −50° C. to about −30° C.

15. A method of applying a composition according to claim 1 to a substrate comprising the steps of:
   (i) providing a composition;
   (ii) heating the composition to a flowable form; and
   (iii) applying the composition to the substrate.

16. A method of providing a threadlocking composition to a thread of a threaded article to be thread locked, the method comprising:
   (i) providing the composition of claim 1;
   (ii) applying the composition to a thread of the threaded article by heating the composition to a flowable liquid form; and
   (iii) optionally passively or actively cooling the composition to provide a solid tack-free form.

17. A method of threadlocking two threaded articles, the method comprising:
   (a) providing the composition of claim 1;
   (b) applying the composition to a thread of at least one of the two threaded articles; and
   (c) threading the two threaded articles together to initiate anaerobic cure of the composition, thereby chemically bonding the two threaded articles.

18. A bolt or a nut, to which the composition of claim 1 has been applied.

19. An assembly comprising two substrates bonded together by a cured form of a composition according to claim 1.

20. The composition of claim 1, wherein the TPU has a solubility value at 65° C. of at least 40% by weight, based on the total weight of the anaerobically curable composition.

21. An anaerobically curable composition in dry to touch form, the anaerobically curable composition formed from:
(a) a liquid anaerobically curable component;
(b) a thermoplastic polyurethane ("TPU") component present in an amount of from about 20% to about 30% by weight, based on the total weight of the anaerobically curable composition, wherein the TPU component comprises:
  (i) polyester segments, based on at least one of a greater than $C_{10}$ diol or a greater than $C_{10}$ dicarboxylic acid, or
  (ii) a (co)polyester of dodecanedioic acid and 1,6-hexanediol, said (co)polyester having a melting point of about 70° C., and with an OH number from about 27 to about 34 mg KOH/g (as measured according to standard procedure DIN 53240-2); and
(c) a curing component for curing the liquid anaerobically curable component, wherein the curing component comprises a peroxide in liquid form free of encapsulation; and
(d) a solvent present in an amount less than 1% by weight, based on the total weight of composition,
wherein the TPU component has a mass average molar mass $M_w$ from about 55,000 to about 75,000, and wherein the TPU is soluble in the composition.

* * * * *